United States Patent [19]

Rao et al.

[11] 3,717,710

[45] Feb. 20, 1973

[54] INDICINE-N-OXIDE AS AN ANTITUMOR AND ANTILEUKEMIC AGENT FOR MICE AND RATS

[75] Inventors: Koppaka V. Rao, Granesville, Fla.; Tom J. McBride, Ridgewood, N.J.

[73] Assignee: Pfizer Inc., New York, N.Y.

[22] Filed: Jan. 28, 1971

[21] Appl. No.: 110,750

[52] U.S. Cl. ................................................ 424/274
[51] Int. Cl. ............................................ A61k 27/00
[58] Field of Search ................................... 424/274

[56] References Cited

OTHER PUBLICATIONS

Culvenor, J. Pharm. Soc. 57: 1112–1117 (1968)

Primary Examiner—Jerome D. Goldberg
Attorney—Connolly and Hutz

[57] ABSTRACT

This invention relates to a process for inhibiting transplanted heoplasias selected from the group consisting of Walker-256 carcinosarcoma, melanoma B-16, leukemia L-1210, leukemia P-388 and leukemia P-1534 in a rat or mouse using N-oxide of the pyrrolizidine alkaloid indicine.

2 Claims, No Drawings

INDICINE-N-OXIDE AS AN ANTITUMOR AND ANTILEUKEMIC AGENT FOR MICE AND RATS

BACKGROUND OF THE INVENTION

This invention relates to the use of indicine-N-oxide to inhibit transplanted tumors and also leukemia in rats and mice. Indicine-N-oxide is the N-oxide of the pyrrolizidine alkaloid indicine which may be isolated from whole plants of *Heliotropium indicum* L. (Mattocks, A. R., et al. *J. Chem. Soc.* 1064, 1961).

Certain pyrrolizidine alkaloids and their corresponding N-oxides are known to exhibit transplanted antitumor activity but those heretofore tested against leukemia have failed to inhibit the leukemic process (Culvenor, C.C.J. *J. Pharm. Soc.* 57:1112–1117, 1968).

SUMMARY OF THE INVENTION

The invention is specifically concerned with a process for inhibiting transplanted neoplasias selected from the group consisting of Walker-256 carcinosarcoma, melanoma B-16, leukemia L-1210, leukemia P-388, and leukemia P-1534 comprising administering to rats or mice an effective dose of the N-oxide of the pyrrolizidine alkaloid indicine.

The therapeutic material of this invention, indicine-N-oxide is obtainable by the ligroin-methanol extraction of whole plants of *Heliotropium indicum L*.

DETAILED DESCRIPTION OF THE INVENTION

Indicine-N-oxide, having the empirical formula $C_{15}H_{25}O_6N$, as a crystalline solid melts in the range 119–120°C, has a specific optical rotation ($[\alpha]^{25}D$) of +34.8° in ethanol, and is readily soluble in water, and lower alcohols and sparingly soluble in acetone, ethyl acetate, chloroform, and ether.

This active principle ma be isolated by ligroin — methanol extraction of ground, whole plants of *Heliotropium indicum* L., or alternatively, by methanol extraction alone. The extract obtained by one of these means may be concentrated with heat to a thick syrup and then shaken between ethyl acetate and water, or it may be passed through a column of sulfonic type cation exchange resin, e.g. Dowex 50 × 4, in the acid form and the adsorbed basic compounds subsequently eluted with dilute $NH_4OH$, concentrated in vacuum, and freeze dried.

The product obtained by either of these processes may then be resuspended in methanol and the methanol solution added to chloroform with stirring. A precipitate will form which may be isolated by filtration with diatomaceous earth filter aid, e.g. Supercel, and this precipitate is then dissolved in water. This aqueous solution (Sol A) may be passed through a bed of sulfonic type cation exchange resin, e.g. Amberlite IR 120 resin, in the sodium form, the column effluent freeze-dried and desalted with methanol and chloroform. The chloroform solution is then filtered through filter aid, concentrated to dryness, resuspended in water, and passed through a bed of quaternary strong base anion exchange resin, e.g. Dowex 1 × 4, in the chloride form. The effluent is then freeze dried and desalted a final time with methanol-chloroform. Indicine-N-oxide is produced as a pale yellow amorphous solid.

The aqueous solution above (Sol. A) may alternatively be freeze dried, redissolved in water and methanol, diluted with chloroform, and put on a column of silica gel suspended in methanol, chloroform and water. The fractions are collected, concentrated, resuspended in water, further concentrated and freeze dried to the product indicine-N-oxide, an off-white amorphous solid.

Indicine-N-oxide produced by either of these two methods may be crystallized from isopropanol and ethyl acetate as colorless rectangular prisms with a melting point of 119°–120° C. The compound shows no characteristic UV absorption spectrum.

The protocol used in testing against the Walker 256 tumor system in rats is that of Cancer Chemotherapy Report No. 25, page 12, December, 1962. The tumor cells are implanted intramuscularly in the thighs of non-inbred albino rats, six animals per test group. Treatment is begun 3 days after implant at one dose daily for 4 days. The animals are sacrificed on the seventh day. The weights of tumors of the test animals are compared with those of control animals.

The protocol used in testing against the B16 melanoma system in mice is that employed in standard Cancer Chemotherapy National Survey Center testing programs for this tumor. The tumor cells are implanted intraperitoneally in $BDF_1$ or C57 B1/6 mice, six animals per test group. Treatment is begun 24 hours after implant, one dose is used daily for 9 days. The median survival time of test animals compared with that of control animals.

The protocol used in testing against murine leukemias L-1210, P-388, and P-1534 is that of Cancer Chemotherapy Report No. 25, December, 1962. Ascitic fluid is implanted intraperitoneally in $BDF_1$ mice, six animals per test group. Treatment is begun 24 hours after the implant, one dose daily for 9 days, or in certain cases, the regimen may be varied to include one dose only, two, three, or five doses. The mean survival time of test animals is compared with that of control animals and the results are expressed as per cent increase in survival time.

Although the crystalline form of indicine-N-oxide is a potent inhibitor of the tumors and leukemias previously specified, purified but non-crystalline forms of this agent may also be used with comparable results. The examples which follow were carried out using such non-crystalline product.

The following examples are given by way of illustration and are not intended to depart from the spirit and scope of the appended claims.

PREPARATION A

A batch of 25 pounds of the dried whole plants of *Heliotropium indicum* L. was stirred twice with 30 liters of ligroin for 24 hours. The solvent was drained and discarded, and the residue was extracted by stirring twice with 30 liters of methanol for 24 hours.

The methanol extract was concentrated to a syrup, shaken between two liters each of ethyl acetate and water and the aqueous layer freeze-dried. This yielded 250 g. of crude extract. One hundred g. of this was stirred with 800 cc of methanol, centrifuged, and the precipitate resuspended in 300 cc of methanol. This was again centrifuged and the combined supernatants concentrated to one-third volume and poured into 6 liters of rapidly stirring chloroform. After 30 minutes of stirring the solution was filtered through Supercel and concentrated to dryness. The residue was dissolved in 1,000 cc of water and passed through a 100 cc bed of Amberlite IR 120 resin in the sodium form. The column effluent was then freeze-dried and desalted by dissolving in 80 cc of methanol and pouring into 1,600 cc of chloroform. The chloroform solution was filtered through Supercel, concentrated to dryness, 500 cc of water was added and passed through a 60 cc bed of Dowex 1 × 4 in the chloride form. The effluent was freeze-dried and desalted by a final treatment with 50 cc of methanol and 1,000 cc of chloroform. Yield of a pale yellow amorphous solid indicine-N-oxide is 7.3 g.

PREPARATION B

Seventy pounds of ground dried whole plants were soaked in methanol overnight at room temperature. The methanol extract was drained and the plants were extracted once more with methanol. The two methanol extractions were combined and passed through a column of Dowex 50 × 4 in the acid form, 1,500 gm damp per 70 pounds of plants. The resin was subsequently washed with methanol to remove color, and then by five volumes of water to remove any presence of methanol.

The absorbed basic compounds were eluted with dilute $NH_4OH$ (1.4 percent aqueous) to a pH greater than 10. The light brown eluate was concentrated in vacuum to three liters and the concentrate freeze dried. The light brown freeze dried solids were dissolved in about 0.5 liters of methanol. The methanol solution was added slowly to five liters of stirred chloroform. The precipitate was filtered through Supercel, and the cake was washed with chloroform-methanol (10:1). The filtrate was concentrated in vacuum and the residue was dissolved in three liters of water. The water solution was freeze dried. Fifty-two grams of light brown solids were obtained.

Thirty-eight grams of the freeze-dried product was dissolved in 20 cc of water and 100 cc of MeOH. The solution was then diluted with 80 cc of chloroform and put on a column of silica gel (800 grams) suspended in three liters of methanol:chloroform:water (5:4:1) in a 1 ½ × 54 glass tube at a rate of 2–3 cc/minute. Effluent fractions were combined and concentrated to remove solvent. Water was added, the samples was further concentrated, and was freeze dried. 23.6 g. of an off-white amorphous solid, indicine-N-oxide, was obtained.

EXAMPLE I

The product of Preparation A was tested against the Walker 256 tumor in rats at varying dosages. The doses used, routes used, regimen, survival rate and results expressed as per cent tumor inhibition are shown in the table below:

| Test No. | Daily dose (Mg/Kg) | Route | Regimen | Survival rate | Tumor inhibition (%) |
|---|---|---|---|---|---|
| 1. | 200 | IP | Days 3–6 | 6/6 | 90 |
|  | 100 |  |  | 6/6 | 72 |
|  | 50 |  |  | 6/6 | 13 |
|  | 25 |  |  | 6/6 | 25 |
| 2. | 200 | Oral |  | 6/6 | 53 |
|  | 100 |  |  | 6/6 | 10 |
| 3. | 200 | IM |  | 6/6 | 80 |
|  | 100 |  |  | 6/6 | 64 |
| 4. | 100 | IV |  | 6/6 | 44 |
|  | 50 |  |  | 6/6 | 32 |
| 5. | 25 |  |  | 6/6 | 0 |
|  | 200 | IP |  | 6/6 | 82 |
|  | 100 |  |  | 6/6 | 67 |
|  | 50 |  |  | 6/6 | 39 |
| 6. | 200 | IP |  | 6/6 | 91 |
|  | 100 |  |  | 6/6 | 68 |
|  | 50 |  |  | 6/6 | 34 |

EXAMPLE II

The product of Preparation B was tested against the B-16 melanoma system in mice at varying dosages daily for 9 days. The route used was intraperitoneal injection. The dosages used, the survival rate, and results expressed as per cent increased life span are shown in the table below:

| Test No. | Dosage (mg/kg) | Survival Rate | Increased Life Span (%) |
|---|---|---|---|
| 1. | 200 | 6/6 | 52 |
|  | 100 | 6/6 | 27 |
|  | 50 | 6/6 | 17 |
|  | 25 | 5/6 | 17 |
|  | 12.5 | 6/6 | 5 |
|  | 6.2 | 6/6 | 7 |
| 2. | 800 | 6/6 | 65 |
|  | 600 | 6/6 | 63 |
|  | 400 | 6/6 | 52 |
|  | 200 | 6/6 | 50 |
|  | 100 | 6/6 | 42 |
|  | 50 | 6/6 | 52 |

EXAMPLE III

The product of Preparation B was tested against the L-1210 murine leukemia system, at varying dosages daily for 9 days. The route used was intraperitoneal injection. The dosages used, survival rate, and results expressed as per cent increased life span are shown in the table below:

| Test No. | Daily Dose (Mg/Kg) | Survival Rate | Increased Life Span (%) |
|---|---|---|---|
| 1. | 200 | 6/6 | 35 |
|  | 100 | 6/6 | 28 |
|  | 50 | 6/6 | 23 |
|  | 25 | 6/6 | 0 |
|  | 12.5 | 6/6 | 0 |
|  | 6.2 | 6/6 | 0 |
| 2. | 600 | 5/6 | 28 |
|  | 400 | 6/6 | 39 |
|  | 200 | 5/6 | 30 |
|  | 100 | 6/6 | 27 |
|  | 50 | 6/6 | 16 |
| 3. | 800 | 6/6 | 26 |
|  | 600 | 6/6 | 47 |
|  | 400 | 6/6 | 43 |

EXAMPLE IV

The product of Preparation B was tested against the P-388 murine leukemia system at varying dosages. The dosages used, route of administration, regimen, survival rate, and results expressed as per cent increased life span are shown below:

| Test No. | Dosage mg/kg | Route | Regimen | Survival rate | Increased life span % |
|---|---|---|---|---|---|
| 1. | 200 | IP | Days 1–9 | 6/6 | 72 |
|  | 100 |  |  | 6/6 | 31 |
|  | 50 |  |  | 6/6 | 31 |
|  | 25 |  |  | 6/6 | 18 |
|  | 12.5 |  |  | 6/6 | 9 |
|  | 6.2 |  |  | 6/6 | 13 |
| 2. | 600 | IP | Days 1–9 | 6/6 | 115 |
|  | 400 |  |  | 6/6 | 120 |
|  | 200 |  |  | 6/6 | 95 |
|  | 100 |  |  | 6/6 | 50 |
|  | 50 |  |  | 6/6 | 30 |
| 3. | 1000 | IP | Days 1–9 | 6/6 | 0 |

| | | | | | |
|---|---|---|---|---|---|
| | 800 | | | 6/6 | 50 |
| | 600 | | | 6/6 | 100 |
| | 400 | | | 6/6 | 86 |
| | 200 | | | 6/6 | 86 |
| 4. | 200 | SC | Days 1–9 | 6/6 | 10 |
| | 100 | | | 6/6 | 10 |
| | 50 | | | 6/6 | 10 |
| 5. | 1000 | IM | Days 1–5 | 6/6 | 81 |
| | 750 | | | 6/6 | 31 |
| | 500 | | | 6/6 | 36 |
| | 250 | | | 6/6 | 18 |
| | 1000 | PO | Days 1–9 | 5/6 | 9 |
| | 500 | | | 6/6 | 0 |
| | 250 | | | 6/6 | 0 |
| 6. | 1000 | IP | Day 1 only | 6/6 | 50 |
| | 750 | | | 6/6 | 45 |
| | 500 | | | 6/6 | 40 |
| | 250 | | | 6/6 | 27 |
| 7. | 1000 | IP | Days 1,5,9 | 5/6 | 104 |
| | 750 | | | 6/6 | 68 |
| | 500 | | | 6/6 | 81 |
| | 250 | | | 6/6 | 54 |
| 8. | 1000 | IP | Days 1,9 | 6/6 | 95 |
| | 750 | | | 6/6 | 54 |
| | 500 | | | 6/6 | 45 |
| | 250 | | | 6/6 | 36 |

EXAMPLE V

The product of Preparation B was tested against the P-1534 murine leukemia system at about 100–600 mg/kg body weight daily for 9 days. The route used was intraperitoneal injection. Dosages used, survival rate, and results express as per cent increased span are shown in the table below:

| Dosage mg/kg | Survival Rate | Increased Life Span (%) |
|---|---|---|
| 600 | 6/6 | 58 |
| 400 | 6/6 | 54 |
| 200 | 6/6 | 7 |
| 100 | 6/6 | 58 |

What is claimed is:

1. A process for inhibiting transplanted neoplasias selected from the group consisting of Walker-256 carcinosarcoma, melanoma B-16, leukemia L-1210, leukemia P-388, and leukemia P-1534 comprising administering to a rat or mouse in need of said treatment an effective dose of the N-oxide of the pyrrolizidine alkaloid indicine.

2. A process according to claim 1 wherein said neoplasia is a leukemia.

* * * * *